United States Patent [19]

McCullough

[11] 4,415,229

[45] Nov. 15, 1983

[54] OPTICAL FIBER SWITCH APPARATUS

[75] Inventor: Harold E. McCullough, Blacklick, Ohio

[73] Assignee: Bell Telephone Laboratories, Incorporated, Murry Hill, N.J.

[21] Appl. No.: 295,555

[22] Filed: Aug. 24, 1981

[51] Int. Cl.³ .............................................. G02B 7/26
[52] U.S. Cl. ................................. 350/96.20; 335/136
[58] Field of Search ...................... 350/96.20, 96.21; 335/1, 2, 107, 119, 120, 136

[56] References Cited

U.S. PATENT DOCUMENTS

| | | | |
|---|---|---|---|
| 4,152,043 | 5/1979 | Albanese | 350/96.20 |
| 4,189,206 | 2/1980 | Terai et al. | 350/96.20 |
| 4,193,662 | 3/1980 | Hara | 350/96.20 X |
| 4,204,744 | 5/1980 | Wittmann | 350/96.20 |
| 4,223,978 | 9/1980 | Kummer et al. | 350/96.20 |
| 4,318,587 | 3/1982 | Grassl | 350/96.20 |

FOREIGN PATENT DOCUMENTS 52-49039  4/1977  Japan ............................ 350/96.20

OTHER PUBLICATIONS

P. G. Hale and R. Kompfner, "Mechanical Optical-Fibre Switch", Electronics Letters, vol. 12, No. 15, Jul. 22, 1976, p. 388.

*Primary Examiner*—John D. Lee
*Attorney, Agent, or Firm*—W. H. Kamstra

[57] ABSTRACT

Optical fiber switch apparatus for selectively coupling the end (16) of a first fiber (17) to the ends of a plurality of second fibers (10) circularly arranged within a housing (12) also enclosing the free end (16) of the first fiber (17). The latter (17) extends through a spherical bearing (20) seatable in a socket (24) formed in the housing end (23), the bearing having a disc (19) fitted about it at right angles to the axis of the first fiber (17). The pole-pieces of a plurality of electromagnets (26) arranged under the periphery of the disc (19) selectively tilt the disc (19) upon selective energization to swing the free end (16) of the first fiber (17) into juxtaposition with the end of a selected second fiber (10'). A hold electromagnet (36) is energized to urge the bearing (20) into its socket (24) and thereby the ends of the two fibers (17, 10') into abutment.

9 Claims, 4 Drawing Figures

OPTICAL FIBER SWITCH APPARATUS

TECHNICAL FIELD

This invention relates to optical fiber apparatus and more particularly to apparatus for selectively switching a transmission path between one optical fiber and a plurality of second fibers.

BACKGROUND OF THE INVENTION

Recent advances in optical fiber technology have promoted the use of these light conducting elements as promising alternative media in the transmission of information signals. Typically, such fibers are light-transparent glass threads on the order of 0.01 inch or less in diameter encased in a sheath or cladding to which it is fused. Light enters one end of the fiber and emerges from the opposite end with minimal loss. The physics of light transmission through a continuous fiber is now well-understood and need not be considered in detail for an understanding of the invention. As in its electrical counterpart, light transmission for broad circuit application requires some means for switching between one light transmission path and two or more other such paths. This has long been readily accomplished in the transmission of electrical signals by providing electro-mechanical relay or switch means which are interposed in the circuits to be controlled. The electrical conductors of the circuits are simply soldered or otherwise connected to the relay or switch terminals. The switching of light transmission paths which include optical fibers has been accomplished more directly. Known optical switching arrangements have generally contemplated the coupling of the actual light conducting media themselves without intervening contacting or circuit completion apparatus. Switching of light transmission paths thus has involved the mechanical movement of the end of the actual conducting fiber itself out of alignment with the end of a second fiber and into alignment with the end of a third fiber. One such prior art switching arrangement is disclosed in U.S. Pat. No. 4,223,978 of R. S. Kummer et al., issued Sept. 23, 1980. In the arrangement there disclosed, four passive fibers are fixedly maintained in the four corners of a square cross-sectioned inner channel of a rigid sleeve. An active fiber extends through a flexible, second sleeve fitted over the rigid sleeve and is arranged so that one end of the active fiber is movable in a plane parallel to the plane of the ends of the passive fibers. The flexible sleeve may then be manually or machine flexed in either direction along two perpendicular axes to selectively bring the active fiber into alignment with the four passive fibers.

In another somewhat similar switching arrangement described in an article entitled "Mechanical Optical-Fibre Switch," by P. G. Hale et al., in *Electronics Letters*, Vol. 12, No. 15, July 22, 1976, the active fiber is fitted with a magnetically responsive metallic sleeve. The active fiber is then moved into selective alignment with the passive fibers by magnetic forces generated by an external electromagnet acting on the metallic sleeve. In each of the foregoing and other switching arrangements, the problem of achieving a precise optical connection between two fiber ends is presented. The ends of the extremely thin fibers must be in precise alignment without offset to achieve light transfer between the fiber ends. In order to minimize loss, the fiber ends must also be in extremely close proximity or actually abutting. These requirements demand that after a passive fiber of a plurality of passive optical fibers has been selected, the active fiber be precisely moved into coupling therewith. It is to these objectives that the optical switch apparatus of the invention is chiefly directed.

SUMMARY OF THE INVENTION

The foregoing and other objectives are realized in one illustrative optial fiber switch apparatus according to the invention in which a plurality of passive optical fibers are circularly and fixedly arranged with their longitudinal axes parallel within the bore of a cylindrical housing. Typically, the bore presents a star-shaped cross-section, each of the fibers being nestled in a "V"-shaped channel formed by the bore, the ends of all the fibers lying in the same plane toward one end of the housing. A single active optical fiber extends centrally in the housing bore from its other end, one end of the active fiber being moveable in a plane slightly removed from the plane of the ends of the passive fibers. The other end of the active fiber extends through a spherical bearing to which it is affixed, the bearing being seatable in a cup-shaped socket in the other end of the housing. The bearing has mounted on its periphery at a diameter a circular, magnetically responsive plate at right angles to the longitudinal axis of the active fiber extending through the bearing. The periphery of the circular plate extends beyond the periphery of the housing over the pole-pieces of a plurality of electromagnets circularly affixed to the outside of the housing, the plate being separated from the socket end of the housing by spring clips affixed thereto. The pole-pieces are positioned on the housing to correspond to the angular positioning of the passive fibers within the housing. A retaining strap operable on the bearing is pivotally controlled by a hold electromagnet both to maintain the bearing in its normal position and to hold the switch in its operated state.

The switch apparatus is operated by energizing the one of the housing peripheral electromagnets positioned 180 degrees opposite the passive optical fiber with which the active fiber is to be coupled. As a result, the circular plate is tilted toward the pole-piece of the energized electromagnet by the magnetic flux generated against the urging of the spring clips. At the same time, the bearing is slightly rotated and seated in its socket to move the active fiber into alignment with the selected passive fiber in its channel. The hold magnet is now energized to hold the bearing firmly in its socket and to move the end of the active fiber into abutment with the end of the selected passive fiber to ensure positive coupling. A plurality of detents formed on the periphery of the circular plate are arranged to engage notches formed in the ends of the pole-pieces to ensure precise alignment of the active fiber. The switch apparatus is restored to its unoperated state by de-energizing the actuated electromagnets, the switch elements being returned to their normal states by the action of the plate spring clips.

BRIEF DESCRIPTION OF THE DRAWING

The organization and operation of an optical switch apparatus according to the principles of the invention together with its features will be better understood from a consideration of the detailed description of one illustrative embodiment thereof which follows when taken in conjunction with the accompanying drawing in which.

DETAILED DESCRIPTION

Figure 1:
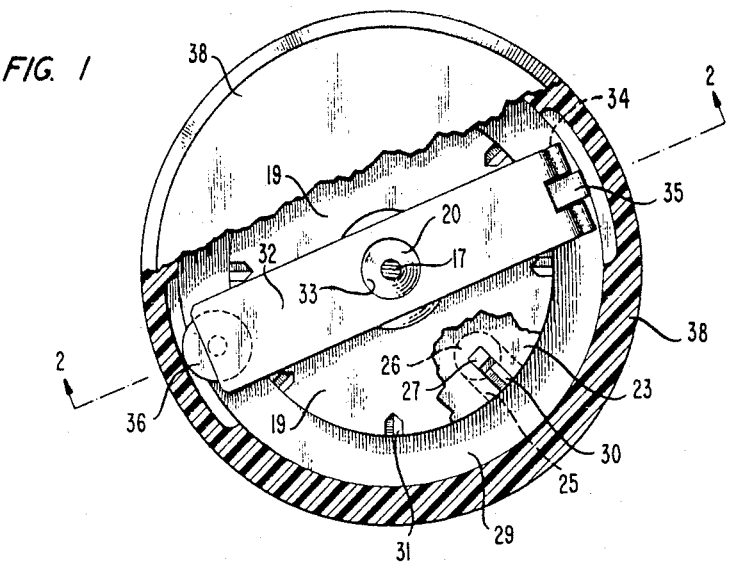
FIGS. 1 and 2 are partially sectioned and broken-away top and sectional side views, respectively, of one illustrative optical fiber switch apparatus according to the invention, the section of the latter view being taken along the lines 2—2 of the view of FIG. 1.
Figure 2:
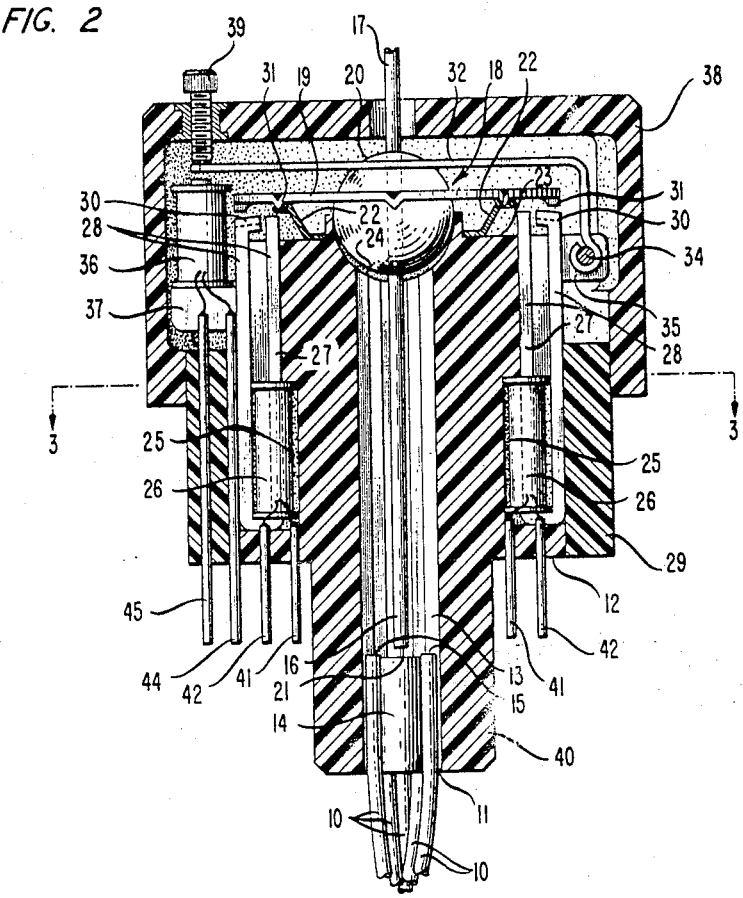

In one specific illustrative optical fiber switch apparatus according to the principles of the invention, a plurality (here eight) of known conventional optical fibers 10, representative ones of which are shown in FIG. 2, extend partially into a bore 11 of an enclosing circular housing 12 which is formed of any suitable insulative material. Bore 11 is formed substantially star-shaped in cross-section (FIG. 3) to present a plurality of "V"-shaped channels 13 for its length in which channel fibers 10 are firmly retained by a retaining plug 14. Faces 15 of the ends of fibers 10 lie in a common plane perpendicular to the longitudinal axis of bore 11. Extending into bore 11 of housing 12 from its other end is the free end 16 of a second known conventional optical fiber 17 which fiber is fixedly passed through an actuating member 18 which in the illustrative embodiment being described comprises a disc 19 fitted about a central, substantially spherical bearing 20. Disc 19 is formed of a suitable magnetically responsive material and bearing 20 may be formed of any suitable plastic material. The face 21 of the free end 16 of fiber 17 is maintained a slight distance from the plane of faces 15 of the ends of fibers 10 by spring clips 22 affixed to the surface 23 perpendicular to the longitudinal axis of bore 11. Spring clips 22 also maintain bearing 20 substantially the same distance out of a spherical socket 24 presented in surface 23 at the end of bore 11.

Figure 3:
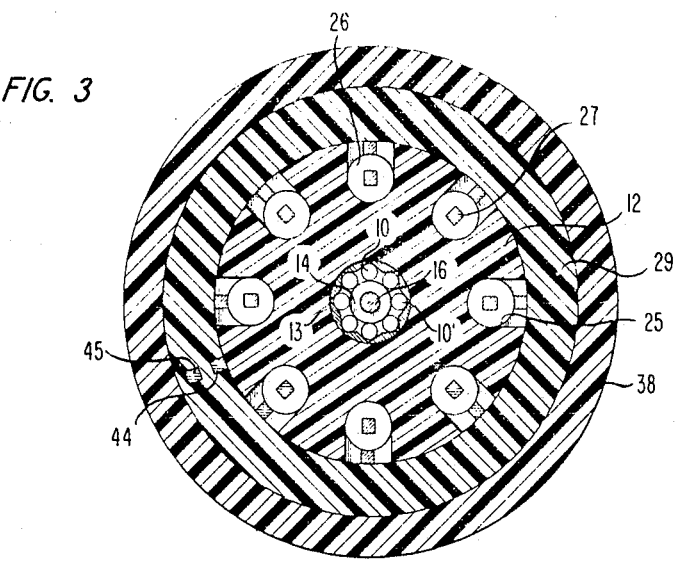
FIG. 3 is a sectional view of the switch apparatus of FIGS. 1 and 2, the section being taken along the lines 3—3 of the view of FIG. 2.

Housing 12 is formed to present a plurality of radially disposed slots 25 about its periphery (FIG. 3) in which are mounted, respectively, a plurality of electromagnets 26, arranged to correspond in angular separation to that of "V"-shaped channels 13 and, therefore, to the angular separation of first optical fibers 10 retained therein (FIG. 3). Electromagnets 26, representative ones of which are shown in FIG. 2, are each provided with "U"-shaped pole-pieces 27, the legs of which extend parallel to the longitudinal axis of bore 11 to present ends 28 terminating a short distance away from and under the rim of disc 19. One leg of each of the pole-pieces 27 extends externally of the winding of each electromagnet 26 outwardly from the axis of bore 11 which external leg provides a convenient means for retaining electromagnets 26 in slots 25 by an encircling insulative band 29 fitted about housing 12. The end 28 of the outer leg of each of the pole-pieces 27 is formed to present a substantially "V"-shaped notch 30 lying at a slight angle with respect to surface 23 of housing 12 upward toward the axis of the latter housing. Notches 30 are formed to receive corresponding detents 31 formed on the opposing face of disc 19 during the operation of the switch apparatus to be described.

A magnetically responsive armature hold strap 32 extends over disc 19 and rests on bearing 20 through a circular aperture 33. At one end, strap 32 is bent at right angles toward housing 12 and is pivotally mounted by means of a pin 34 passed through a lug 35 extending outwardly from housing 12 between two of the pole-pieces 27. At its other end, strap 32 extends over the pole-piece of a hold electromagnet 36 mounted on a pedestal 37 extending outwardly from housing 12 between two of the pole-pieces 27 opposite the two previously mentioned. Fitted over the assembly thus far described is an insulative cap 38 which is press-fitted about insulative band 29, cap 38 being suitably contoured within to accommodate the switch elements and being centrally apertured to pass fiber 17. Directly over the pole-piece of electromagnet 36, cover 38 is provided with a tapped hole into which a set-screw 39 is screwed to act as a stop for armature strap 32 (FIG. 2).

Electrical connections for the switch apparatus are made by conductors which may be molded in housing 12 or otherwise extended therethrough and to which ready access may be had within its outer periphery by an annular inset 40 formed in its surface. Each of the electromagnets 26 is connected to a pair of terminals 41 and 42 extending externally from the shoulder 43 formed by inset 40 of housing 12. Hold electromagnet 36 is connected to a pair of similarly extending terminals 44 and 45. Optical fibers 10 as well as fiber 17 are shown in the drawing as unterminated. It will be appreciated that in practice these fibers will be coupled to suitable light generating and receiving devices well-known in the art, which devices need not be considered here as not comprising elements of the switch apparatus of the invention.

Figure 4:
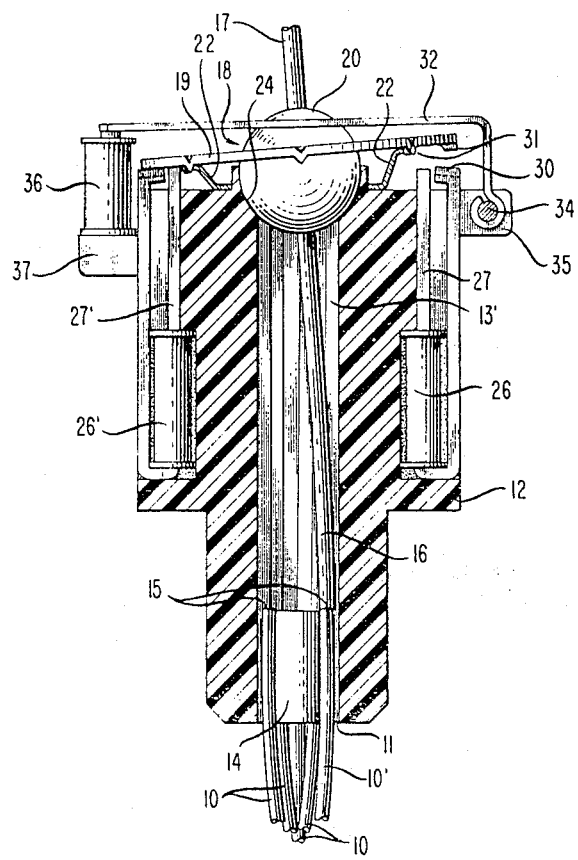
FIG. 4 is an abbreviated view of the view of the switch apparatus of FIG. 2 depicting the apparatus in one of its operated states.

With the foregoing organization of an illustrative switch apparatus according to the invention in mind, an illustrative operation thereof may now be considered with particular reference to FIG. 4 which is an abbreviated version of the view of FIG. 2, identical elements being designated by the same reference characters. For the illustrative operation, it will be assumed that free end 16 of second fiber 17 is to be coupled to the end of fiber 10' of the plurality of first fibers 10. Electromagnet 26' positioned diametrically opposite from fiber 10' is initially energized via its terminals 41 and 42. The remaining electromagnets remain unenergized. As a result, a magnetic force is generated to attract a bearing surface of disc 19 to pole-piece 27' of electromagnet 26'. Disc 19 is thus caused to tilt against the action of spring clips 22, a detent 31 fitting into a notch 30 presented at the end of a leg of pole-piece 27' of electromagnet 26'. As a result, the free end 16 of fiber 17 is deflected laterally into bore channel 13' also occupied by selected fiber 10'. Detents 31 and notches 30 ensure the precise deflection of free end 16 of fiber 17. Electromagnet 36 is now energized via its terminals 44 and 45 to pull down armature strap 32 about its pivot pin 34 thereby to seat bearing 20 in socket 24 and to move fiber 17 free end 16 into positive abutment with face 15 of fiber 10'. At this time, electromagnet 26' may be deenergized, the switch being maintained in its operated state by the continued energization of hold electromagnet 36. The switch apparatus is subsequently restored to its unoperated state by the release of hold electromagnet 36 and the action of spring clips 22.

What has been described is considered to be only one specific illustrative optical fiber switch apparatus according to the principles of the invention. Accordingly, it is to be understood that various and numerous other arrangements may be devised by one skilled in the art without departing from the spirit and scope of the invention as limited only by the accompanying claims.

What is claimed is:

1. Optical fiber switch apparatus comprising a plurality of fixed first optical fibers having circularly arranged ends, a magnetically responsive actuating member having circularly disposed bearing surfaces arranged to correspond to said circularly arranged fiber ends, said member being mounted to be tiltable about predetermined axes, a second optical fiber fixedly extending through said actuating member substantially at the intersection of said axes, said second fiber having a free end extending toward said ends of said first fibers substantially centrally thereof, and a plurality of first electromagnets having pole-pieces associated respectively with said circularly disposed bearing surfaces, said electromagnets being selectively energizable to tilt said actuating member about one of said axes thereby to swing said free end of said second fiber into alignment with the end of a selected one of said plurality of first fibers.

2. Optical fiber switch apparatus as claimed in claim 1 in which said ends of said plurality of first optical fibers extend into a bore of an enclosing housing and also comprising means for aligning said actuating member comprising a substantially spherical surface extending from said actuating member having an axis intersecting said intersection of said predetermined axes at substantially right angles, said housing having a substantially spherical socket at one end surface thereof for seating said spherical surface.

3. Optical fiber switch apparatus as claimed in claim 2 also comprising means for biasing said actuating member and thereby said free end of said second fiber in an unoperated position comprising spring means acting between said actuating member and said one end surface of said housing.

4. Optical fiber switch apparatus as claimed in claims 2 or 3 also comprising means for circularly aligning said actuating member comprising a plurality of detents formed respectively on said bearing surfaces, said pole-pieces having end notches adapted to receive said detents.

5. Optical fiber switch apparatus as claimed in claim 4 in which said bore of said housing has a substantially star-shaped cross-section to present a plurality of "V"-shaped channels lying parallel with the longitudinal axis of said bore for locating respectively said plurality of first fibers and for guiding said free end of said second fiber.

6. Optical fiber switch apparatus as claimed in claim 5 also comprising a substantially spherical bearing fitted centrally through said actuating member at said intersection of said predetermined axes, said spherical surface extending from said actuating member comprising a portion of the surface of said spherical bearing.

7. Optical fiber switch apparatus as claimed in claim 5 also comprising means for moving said free end of said second fiber into abutment with said selected one of said plurality of first fibers comprising a second electromagnet and hold means operating on said actuating member responsive to the energization of said second electromagnet to seat said spherical surface in said socket.

8. Optical fiber switch apparatus as claimed in claim 7 in which said actuating member comprises a disc.

9. Optical fiber switch apparatus as claimed in claim 3 in which said hold means comprises a magnetically responsive strap pivotally mounted at one end, said strap operating on a surface of said bearing against the action of said spring means as the result of the magnetic force generated by the energization of said second electromagnet at its other end.

* * * * *